United States Patent

Takatsu et al.

[11] Patent Number: 5,844,889
[45] Date of Patent: Dec. 1, 1998

[54] DIFFERENT SYSTEM TRANSFER METHOD FOR A RING TRANSMISSION SYSTEM AND TRANSMISSION APPARATUS

[75] Inventors: Kazuo Takatsu; Atsuki Taniguchi, both of Kawasaki, Japan

[73] Assignee: Fujitsu Limited, Kanagawa, Japan

[21] Appl. No.: 681,890

[22] Filed: Jul. 29, 1996

[30] Foreign Application Priority Data

Feb. 5, 1996 [JP] Japan .................................. 8-018563

[51] Int. Cl.⁶ .................................................. H04L 12/42
[52] U.S. Cl. ........................ 370/223; 370/906; 370/907; 359/119
[58] Field of Search .................................... 370/217, 221, 370/222, 258, 223, 404, 405, 424, 452, 460, 906, 907, 909, 224, 225; 359/118, 119

[56] References Cited

U.S. PATENT DOCUMENTS

| | | | |
|---|---|---|---|
| 5,049,871 | 9/1991 | Sturgis et al. | 370/223 |
| 5,081,452 | 1/1992 | Cozic | 370/223 |
| 5,189,541 | 2/1993 | Konishi | 370/223 |
| 5,278,824 | 1/1994 | Kremer | 370/223 |
| 5,412,652 | 5/1995 | Lu | 370/223 |
| 5,446,725 | 8/1995 | Ishiwatari . | |
| 5,537,393 | 7/1996 | Shioda et al. | 359/119 |
| 5,576,875 | 11/1996 | Chawki et al. | 359/115 |
| 5,600,631 | 2/1997 | Takatori et al. | 370/217 |
| 5,717,796 | 2/1998 | Clendening et al. | 359/119 |

FOREIGN PATENT DOCUMENTS 6268659  9/1994  Japan .

Primary Examiner—Hassan Kizou
Assistant Examiner—Soon-Dong Hyun
Attorney, Agent, or Firm—Helfgott & Karas, P C.

[57] ABSTRACT

There is provided a different system transfer method for a ring transmission system and a transmission apparatus for transferring the ring transmission system constructed in the UPSR system to the BLSR system while a line is in service. A control board of the UPSR system is replaced by a control board of the BLSR system. By changing over a path switch, a multiplexing/demultiplexing conversion board of the UPSR system on the non-operating side is replaced by a first multiplexing/demultiplexing conversion board of the BLSR system which is set so as to operate in the UPSR system. Also, by changing over the path switch again, a multiplexing/demultiplexing conversion board of the UPSR system on the non-operating side is replaced by a second multiplexing/demultiplexing conversion board of the BLSR system which is set so as to operate in the UPSR system. Next, the first and second multiplexing/demultiplexing conversion boards are made to operate in the BLSR system, and a line arrangement is changed from the UPSR system to the BLSR system.

5 Claims, 14 Drawing Sheets

DIFFERENT SYSTEM TRANSFER METHOD FOR A RING TRANSMISSION SYSTEM AND TRANSMISSION APPARATUS

BACKGROUND OF THE INVENTION (1) Field of the Invention

The present invention relates to a different system transfer method for a ring transmission system and a transmission apparatus and, more particularly, to a different system transfer method for a ring transmission system, in which a ring transmission system of the UPSR (Uni-directional Path Switched Ring) system is transferred to the BLSR (Bi-directional Line Switched Ring) system during operation, and a transmission apparatus to which the aforementioned method is applied.

(2) Description of the Related Art

In recent years, as the transmission capacity of an optical transmission system increases, an optical transmission system having a line remedy capability in fault and a high line usage rate is demanded.

Conventionally, the UPSR system and the BLSR system are available as an operation mode of a ring optical transmission system formed into a ring shape by linking a plurality of nodes with two optical fibers for each node. In the UPSR system, the same transmission signal is transmitted in the west direction and east direction, and if there is a fault in the midway path to the receiving side, the transmission signal passing through the no-fault side is selected at the receiving side. In this system, one of the two optical fibers is used as a work line, and the other as a protection line. In the BLSR system, a half of the transmission capacity of one optical fiber is used as a work line, and the remaining half as a protection line. If there is a fault in the midway path of a line, line remedy is made by loop back processing at the node and the use of the protection line of the other line.

The ring optical transmission system of the UPSR system has so far been prevailing.

The line usage rate of the UPSR system is 50 percent regardless of the number of nodes in the ring, while the line usage rate of the BLSR system is 50 percent when the number of nodes in the ring is two, and the line usage rate increases as the number of nodes in the ring increases further. Therefore, the BLSR system attracts attention in the high-capacity optical transmission system, and a demand for replacing an optical transmission apparatus of the UPSR system by an optical transmission apparatus of the BLSR system has increased.

However, not only the line changeover system itself for line remedy differs between the UPSR system and the BLSR system, but also the setting method for signal path, the method for dealing with a trouble, etc. differ. Therefore, in the replacement of the optical transmission apparatus of node, it is necessary to temporarily interrupt the operation of the whole of the optical transmission system in order to make replacement. This presents a problem in that a time period during which the line cannot be used takes place.

SUMMARY OF THE INVENTION

An object of the present invention is to provide a different system transfer method for a ring transmission system and a transmission apparatus, which are capable of transferring the ring transmission system constructed in the UPSR system to the BLSR system while a line is in service.

To achieve the above object, there is provided a different system transfer method for a ring transmission system in which a ring transmission system of the UPSR (Uni-directional Path Switched Ring) system is transferred to the BLSR (Bi-directional Line Switched Ring) system during operation. This different system transfer method for a ring transmission system comprises the steps of (1) replacing a control board of the UPSR system by a control board of the BLSR system; (2) changing over a path switch to one direction to replace a multiplexing/demultiplexing conversion board of the UPSR system, which is positioned in the other direction, by a first multiplexing/demultiplexing conversion board of the BLSR system, and at the same time, making the first multiplexing/demultiplexing conversion board operate in the UPSR system; (3) changing over the path switch to the other direction to replace a multiplexing/demultiplexing conversion board of the UPSR system, which is positioned in the one direction, by a second multiplexing/demultiplexing conversion board of the BLSR system, and at the same time, making the second multiplexing/demultiplexing conversion board operate in the UPSR system; (4) making the first and second multiplexing/demultiplexing conversion boards operate in the BLSR system; and (5) changing a line arrangement set at the first and second multiplexing/demultiplexing conversion boards from the UPSR system to the BLSR system.

Further, to achieve the above object, there is provided a transmission apparatus which is transferred from the UPSR (Uni-directional Path Switched Ring) system to the BLSR (Bi-directional Line Switched Ring) system during operation. This transmission apparatus comprises a control board of the BLSR system by which a control board of the UPSR system is replaced; a first multiplexing/demultiplexing conversion board of the BLSR system by which, when a path switch is changed over to one direction, a multiplexing/demultiplexing conversion board of the UPSR system, which is positioned in the other direction, is replaced, and which is at the same time made to operate in the UPSR system; a second multiplexing/demultiplexing conversion board of the BLSR system by which, when the path switch is changed over to the other direction, a multiplexing/demultiplexing conversion board of the UPSR system, which is positioned in the one direction, is replaced, and which is at the same time made to operate in the UPSR system; operation control means for making the first and second multiplexing/demultiplexing conversion boards operate in the BLSR system; and changing means for changing a line arrangement set at the first and second multiplexing/demultiplexing conversion boards from the UPSR system to the BLSR system.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
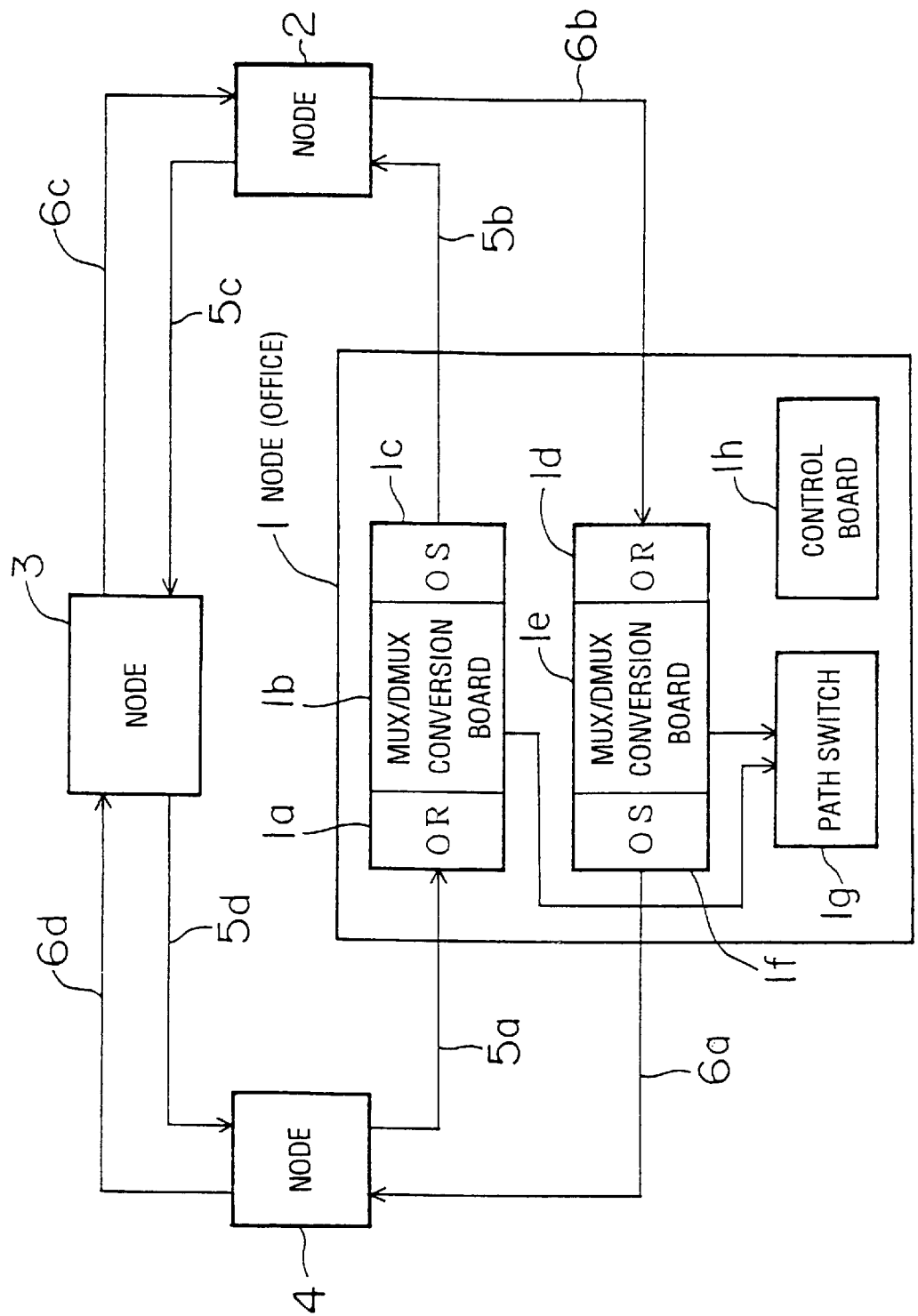
FIG. 1 is a view for illustrating the principle of the present invention.

An embodiment of the present invention will be described with reference to the drawings.

First, the configuration of the embodiment will be described with reference to FIG. 1. In the embodiment of the present invention, it is assumed that a ring transmission system comprises, for example, four nodes (offices) 1 to 4 and two sets of optical fibers 5a to 5d and 6a to 6d for connecting these nodes. Each of nodes 1 to 4 has the same internal configuration of the UPSR system. Explaining node 1 by way of example, node 1 comprises an optical receiving section (OR) 1a located on the optical fiber 5a, a multiplexing/demultiplexing conversion board 1b of the UPSR system, an optical source section (OS) 1c, an optical receiving section (OR) 1d located on the optical fiber 6a, a multiplexing/demultiplexing conversion board 1e of the UPSR system, an optical source section (OS) 1f, a path switch 1g, and a control board 1h of the UPSR system.

Next, the detailed configuration of the embodiment of the present invention will be described with reference to FIGS. 2 to 4.

Figure 2:
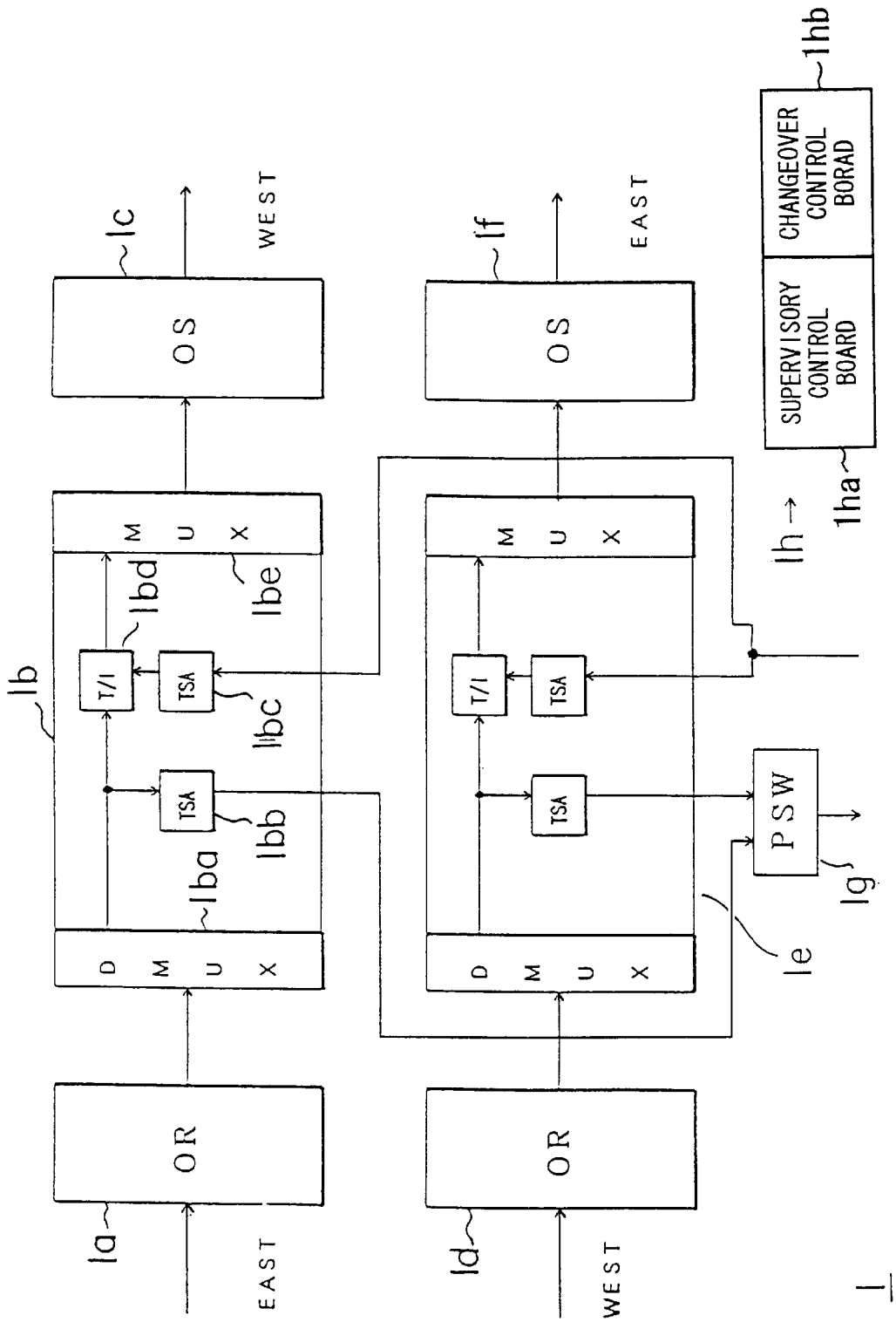
FIG. 2 is a block diagram showing an internal configuration of a node of the UPSR system.

FIG. 2 is a block diagram showing the internal configuration of the node 1 of the UPSR system. In FIG. 2, the optical receiving section 1a receives an optical signal sent from the east direction, converts it into an electrical signal, and sends it to the multiplexing/demultiplexing conversion board 1b. The optical source section 1c converts an electrical signal sent from the multiplexing/demultiplexing conversion board 1b into an optical signal, and sends it to the west direction. The multiplexing/demultiplexing conversion board 1b comprises a demultiplexing section (DMUX) 1ba, TSA (Time Slot Assignment) sections 1bb and 1bc, a T/I (Through or Insert) section 1bd, and a multiplexing section (MUX) 1be. A signal to be dropped is sent to the path switch (PSW) 1g through the demultiplexing section 1ba and the TSA section 1bb. A signal to be added is sent to the multiplexing section 1be through the TSA section 1bc and the T/I section 1bd. A signal to be passed through is sent to the multiplexing section 1be through the multiplexing section 1ba and the T/I section 1bd.

The configuration and the operation of the optical receiving section 1d, the multiplexing/demultiplexing conversion board 1e, and the optical source section 1f are completely the same as those of the optical receiving section 1a, the multiplexing/demultiplexing conversion board 1b, and the optical source section 1c, so that the explanation is omitted. The orientation of the arrangement of the optical receiving section 1d, the multiplexing/demultiplexing conversion board 1e, and the optical source section 1f shown in FIG. 2 is opposite to that of the arrangement thereof shown in FIG. 1, which is for matching with the orientation of arrangement shown in FIG. 3, described later.

The path switch 1g selects and puts out a faultless signal based on the alarm information included in the signals sent from the east and west directions. The control board 1h comprises a supervisory control board 1ha and a changeover control board 1hb.

Figure 3:
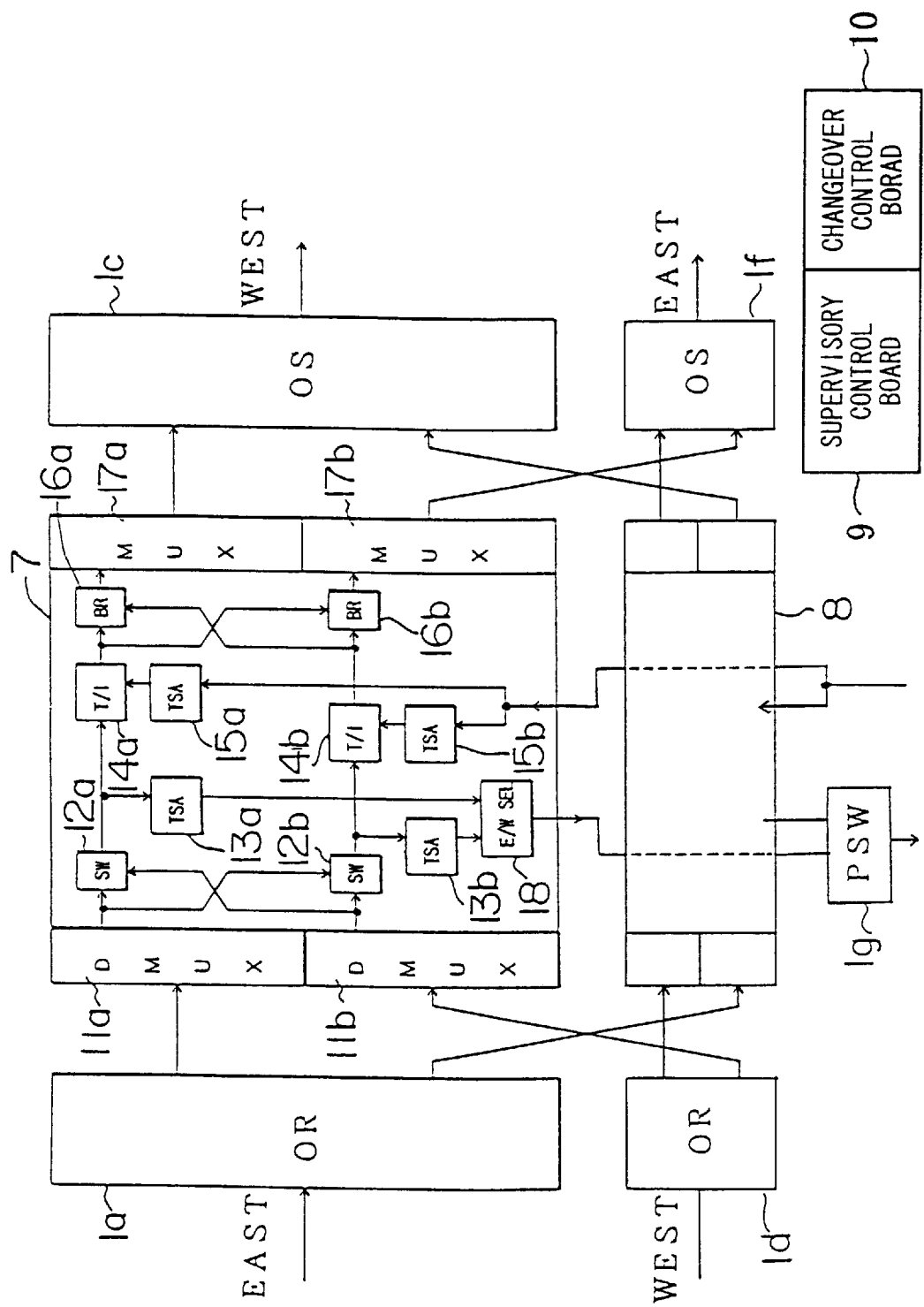
FIG. 3 is a block diagram showing an internal configuration of a node of the BLSR system.

FIG. 3 is a block diagram showing the internal configuration of a node of the BLSR system. FIG. 3 shows a state in which the multiplexing/demultiplexing conversion boards 1e and 1b of the UPSR system shown in FIG. 2 are replaced by first and second multiplexing/demultiplexing conversion boards 8 and 7, the supervisory control board 1ha of the UPSR system is replaced by a supervisory control board 9 of the BLSR system, and the changeover control board 1hb is replaced by a changeover control board 10.

Since the first multiplexing/demultiplexing conversion board 8 and the second multiplexing/demultiplexing conversion board 7 have the same configuration, only the second multiplexing/demultiplexing conversion board 7 will be described. The second multiplexing/demultiplexing conversion board 7 comprises a demultiplexing section (DMUX) 11a, a ring switch (SW) 12a, TSA (Time Slot Assign) sections 13a and 15a, a T/I (Through or Insert) section 14a, a ring bridge section (BR) 16a, and a multiplexing section (MUX) 17a, and a demultiplexing section (DMUX) 11b, a ring switch (SW) 12b, TSA (Time Slot Assign) sections 13b and 15b, a T/I (Through or Insert) section 14b, a ring bridge section (BR) 16b, a multiplexing section (MUX) 17b, and an E/W selector (E/W SEL) 18. A signal from the east direction is put into the demultiplexing section 11a, and a signal from the west direction is put into the demultiplexing section 11b. The output signal of the multiplexing section 17a is sent to the west direction, and the output signal of the multiplexing section 17b is sent to the east direction.

The ring switches 12a and 12b are used for the loop back in line fault of a signal to be dropped or to be passed through, and the ring bridge sections 16a and 16b are used for the loop back in line fault of a signal to be added or to be passed through.

The signals sent from the east and west directions to the second multiplexing/demultiplexing conversion board 7 are also sent to the first multiplexing/demultiplexing conversion board 8. The second and first multiplexing/demultiplexing conversion boards 7 and 8 perform the same signal processing. Therefore, the second and first multiplexing/demultiplexing conversion boards 7 and 8 form a redundant configuration. The E/W selector 18 selects a drop signal from the east or west direction for each channel, and sends the output to the path switch 1g. The path switch 1g receives the drop signal from the second multiplexing/ demultiplexing conversion board 7 and the drop signal from the first multiplexing/demultiplexing conversion board 8, and operates so as to select a signal of the work line side and put it out. That is to say, in the BLSR system, the path switch 1g is used for changeover between work and protection lines.

Figure 4:
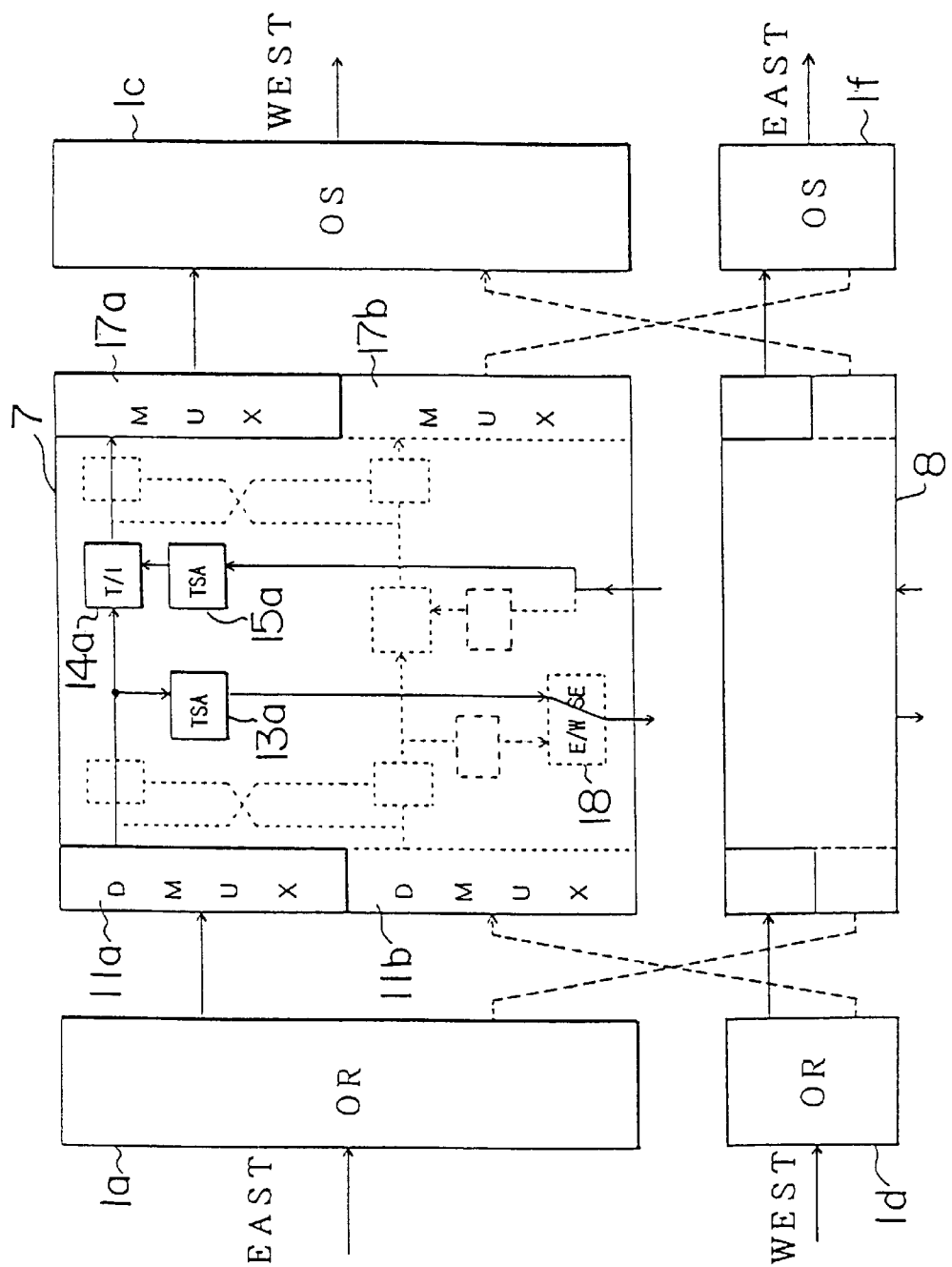
FIG. 4 is a view showing a case where the node of the BLSR system shown in FIG. 3 is operated in the UPSR system.

FIG. 4 shows a case where the node (the optical transmission apparatus) of the BLSR system shown in FIG. 3 operates in the UPSR system. In FIG. 4, the broken lines indicate portions which do not relate directly to the system operation of the UPSR system. The operation state shown in FIG. 4 is the same as the operation of the node of the UPSR system shown in FIG. 2. From this fact, it is found that the node of the BLSR system can perform the same system operation as that of the node of the UPSR system. That is to say, even if the multiplexing/demultiplexing conversion board in the ring optical transmission system of the UPSR system is replaced by that of the BLSR system, that multiplexing/demultiplexing conversion board is made to operate in the UPSR system, and at the stage at which all multiplexing/demultiplexing conversion boards in the system are replaced, all the multiplexing/demultiplexing conversion boards are made to operate in the BLSR system, by which the ring optical transmission system can be transferred from the UPSR system to the BLSR system while the system is in service.

Next, a procedure for transferring a ring optical transmission system from the UPSR system to the BLSR system during operation will be described with reference to FIG. 5.

Figure 5:
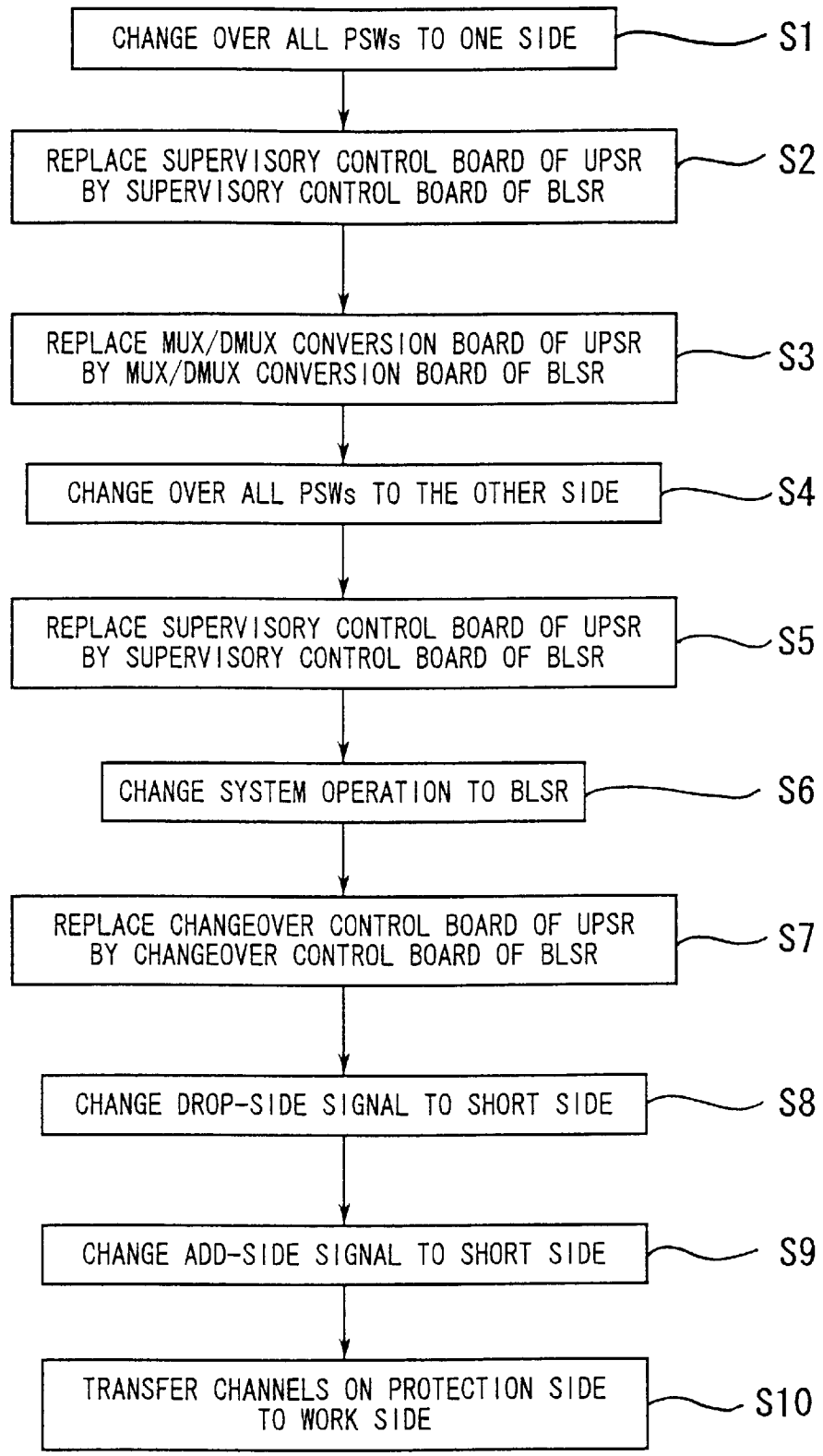
FIG. 5 is a flowchart showing a first procedure for transferring a ring optical transmission system from the UPSR system to the BLSR system during operation.

FIG. 5 is a flowchart showing a first procedure for transferring a ring optical transmission system from the UPSR system to the BLSR system during operation. Hereafter, the explanation will be made following the step numbers in FIG. 5.

[S1] First, the path switches of all the nodes 1 to 4 in FIG. 1 are changed over to one side, for example, to the side on which the demultiplexing signal from the multiplexing/demultiplexing conversion board in connection with the optical fibers 5a to 5d is selected. This changeover of the path switch is performed manually by means of the control board 1h shown in FIG. 1 and a high-level controller (not shown).

[S2] The supervisory control board 1ha (FIG. 2) of the UPSR system in the node 1 is replaced by the supervisory control board 9 of the BLSR system shown in FIG. 3. The details of this replacement will be described later with reference to FIGS. 11 to 13.

[S3] The multiplexing/demultiplexing conversion board 1e of the UPSR system in the node 1 shown in FIG. 1 is replaced by the first multiplexing/demultiplexing conversion board 8 of the BLSR system shown in FIG. 3. However, the operation of the first multiplexing/demultiplexing conversion board 8 is kept being the system operation of the UPSR system as shown in FIG. 4. Since the multiplexing/demultiplexing conversion board 1e is on the protection side due to the changeover of the path switch 1g performed by the execution of the above Step S1, the replacement can be made even during the operation of the line.

Although omitted in the flowchart in FIG. 5, the above Steps S2 and S3 are executed in sequence for other nodes 2 to 4. Since the nodes are about 40 km apart from each other, a replacement worker goes to each node by moving along the ring, and executes the above Steps S2 and S3. The replacement worker goes around the ring.

[S4] Next, the path switches of all the nodes 1 to 4 are changed over to the other side, for example, to the side on which the demultiplexing signal from the multiplexing/demultiplexing conversion board in connection with the optical fibers 6a to 6d is selected.

[S5] The multiplexing/demultiplexing conversion board 1b of the UPSR system in the node 1 shown in FIG. 1 is replaced by the second multiplexing/demultiplexing conversion board 7 of the BLSR system shown in FIG. 3. However, the operation of the second multiplexing/demultiplexing conversion board 7 is kept being the system operation of the UPSR system as shown in FIG. 4. Since the multiplexing/demultiplexing conversion board 1b is on the protection side due to the changeover of the path switch 1g performed by the execution of the above Step S4, the replacement can be made even during the operation of the line.

Although omitted in the flowchart in FIG. 5, the above Step S5 is executed in sequence for other nodes 2 to 4. Therefore, the replacement worker goes again around the ring.

[S6] The system operation of all the nodes 1 to 4 is changed to the BLSR system. This change is made in sequence for all the nodes by the setting operation from the high-level controller.

[S7] The changeover control board 1hb (FIG. 2) of the UPSR system in the node 1 is replaced by the changeover control board 10 of the BLSR system shown in FIG. 3. This replacement is made for all the nodes. Therefore, the replacement worker goes again around the ring to make replacement.

[S8] The lines are rearranged by the execution of Steps S8 to S10. The processing in Steps S8 to S10 is performed by the operation of an operator. First, in order that the same transmission signal which has been sent to both directions (the long side on which the number of midway nodes is large and the short side on which the number of midway nodes is small) of the ring in the UPSR system to send to the short side only, the signal receiving section (drop side) on the long side is shut off. This is done by the line setting processing of the drop-side TSA section.

[S9] Next, the signal transmitting section (add side) on the long side is shut off. This is done by the line setting processing of the add-side TSA section.

[S10] Of the signals which have been transmitted on the short side, the signal using a channel on the protection side in the BLSR system is transferred to the work side. That is to say, when CH1 to CH24 are used as the work channels and CH25 to CH48 are used as the protection channels in the BLSR system, any signal which has been transmitted by using any of CH25 to CH48 on the short side is transferred to any of CH1 to CH24.

In the above first procedure, since the path switch in each node is changed over in Steps S1 and S2, momentary shutoff of transmission signal occurs 2N times (N denotes the number of nodes) in the whole system. Also, since the replacement worker goes around the ring in each of Steps S2 and S3, Step S5, and Step S7, the replacement worker must go around the ring a total of three times.

The above-described procedure for transferring from the UPSR system to the BLSR system will be explained with reference to FIGS. 6 to 10. FIGS. 6 to 10 show a ring optical transmission system by exemplifying two nodes 21 and 22 of a ring configuration. In FIGS. 6 to 10, the node 21 comprises an optical receiving section (OR) 21a, a multiplexing/demultiplexing conversion board 21b, and an optical source section (OS) 21c of inner circuit, and an optical receiving section (OR) 21d, a multiplexing/demultiplexing conversion board 21e, and an optical source section (OS) 21f of outer circuit. Similarly, the node 22 comprises an optical receiving section (OR) 22a, a multiplexing/demultiplexing conversion board 22b, and an optical source section (OS) 22c of inner circuit, and an optical receiving section (OR) 22d, a multiplexing/ demultiplexing conversion board 22e, and an optical source section (OS) 22f of outer circuit. For the multiplexing/ demultiplexing conversion boards shown in FIGS. 6–10, a multiplexing/demultiplexing conversion board of the UPSR system is shown by a white block, and a multiplexing/ demultiplexing conversion board of the BLSR system is shown by a hatched block. Also, the parentheses show which of the operations of the UPSR system and the BLSR system is performed by the multiplexing/demultiplexing conversion board.

Figure 6:
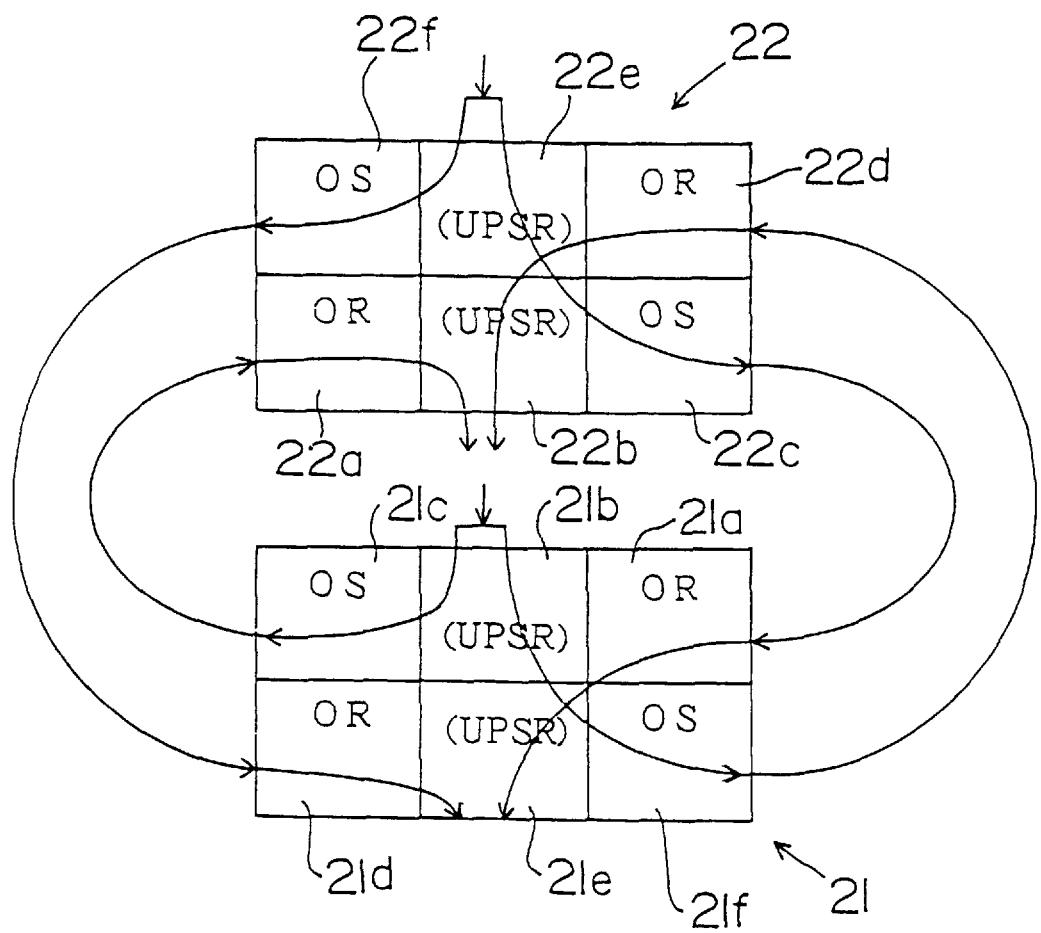
FIG. 6 is a view showing a first stage during the transfer of a ring optical transmission system from the UPSR system to the BLSR system.

FIG. 6 shows a case where all of the multiplexing/ demultiplexing conversion boards are of the UPSR system and the system operation is also of the UPSR system. That is to say, the same signal is sent from the multiplexing/ demultiplexing conversion board 21b of the UPSR system in the node 21 to the multiplexing/demultiplexing conversion board 22b of the UPSR system in the node 22 by the inner and outer circuits. Also, the same signal is sent from the multiplexing/demultiplexing conversion board 22e of the UPSR system in the node 22 to the multiplexing/ demultiplexing conversion board 21e of the UPSR system in the node 21 by the inner and outer circuits.

Figure 7:
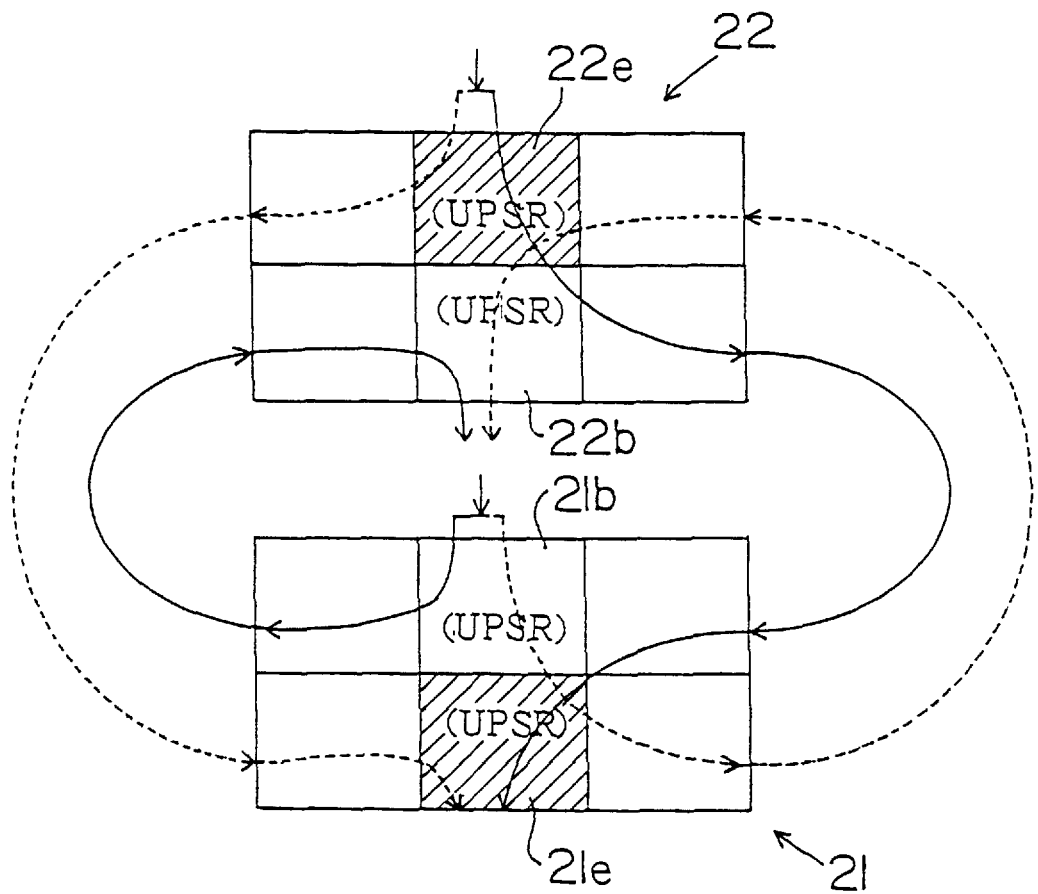
FIG. 7 is a view showing a second stage during the transfer of a ring optical transmission system from the UPSR system to the BLSR system.

FIG. 7, which corresponds to Steps S1 and S3 in FIG. 5, shows a state in which the multiplexing/demultiplexing conversion boards 21e and 22e of the UPSR system on the outer circuit side are replaced by the multiplexing/ demultiplexing conversion boards of the BLSR system. That is to say, the path switches (not shown) in the nodes 21 and 22 are changed over to the inner circuit side, the multiplexing/demultiplexing conversion boards 21e and 22e of the UPSR system on the outer circuit side is kept at a nonoperating state, and these boards are replaced by multiplexing/demultiplexing conversion boards of the BLSR system. However, these multiplexing/demultiplexing conversion boards of the BLSR system are set in the operation state of the UPSR system as shown in FIG. 4.

Figure 8:
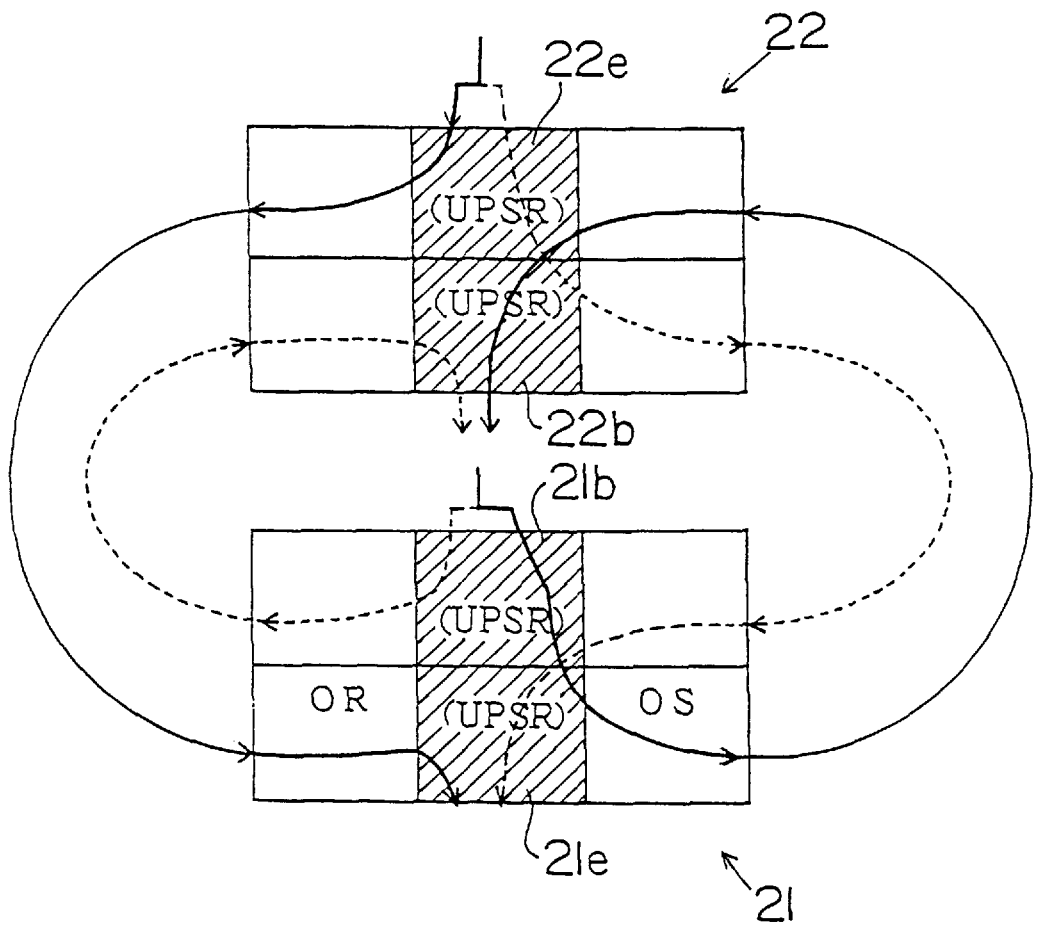
FIG. 8 is a view showing a third stage during the transfer of a ring optical transmission system from the UPSR system to the BLSR system.

FIG. 8, which corresponds to Steps S4 and S5 in FIG. 5, shows a state in which the multiplexing/demultiplexing conversion boards 21b and 22b of the UPSR system on the inner circuit side are replaced by the multiplexing/ demultiplexing conversion boards of the BLSR system. That is to say, the path switches in the nodes 21 and 22 are changed over to the outer circuit side, the multiplexing/ demultiplexing conversion boards 21b and 22b of the UPSR system on the inner circuit side is kept at a nonoperating state, and these boards are replaced by multiplexing/ demultiplexing conversion boards of the BLSR system. However,these multiplexing/demultiplexing conversion boards of the BLSR system are set in the operation state of the UPSR system as shown in FIG. 4.

Figure 9:
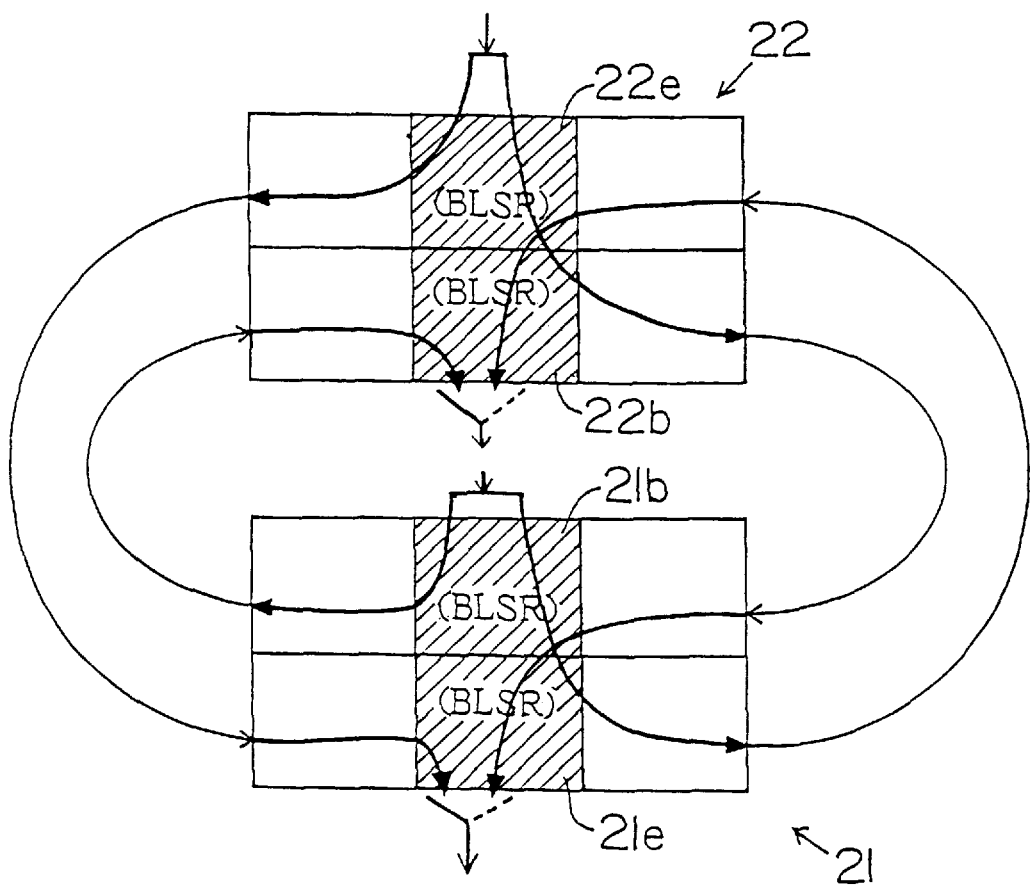
FIG. 9 is a view showing a fourth stage during the transfer of a ring optical transmission system from the UPSR system to the BLSR system.

FIG. 9, which corresponds to Step S6 in FIG. 5, shows a state in which the operation of the multiplexing/ demultiplexing conversion board converted into the BLSR system is set to the BLSR system. That is to say, although the multiplexing/demultiplexing conversion boards in the nodes 21 and 22 have been converted into the BLSR system, the operation thereof is set to the operation of the UPSR system. Therefore, the operation of the multiplexing/ demultiplexing conversion boards is changed to the system operation of the BLSR system. That is to say, the ring switch (SW) and ring bridge (BR), which have been set to the UPSR system, are changed to the setting for the BLSR system. However, the line setting is still left in the UPSR system.

Figure 10:
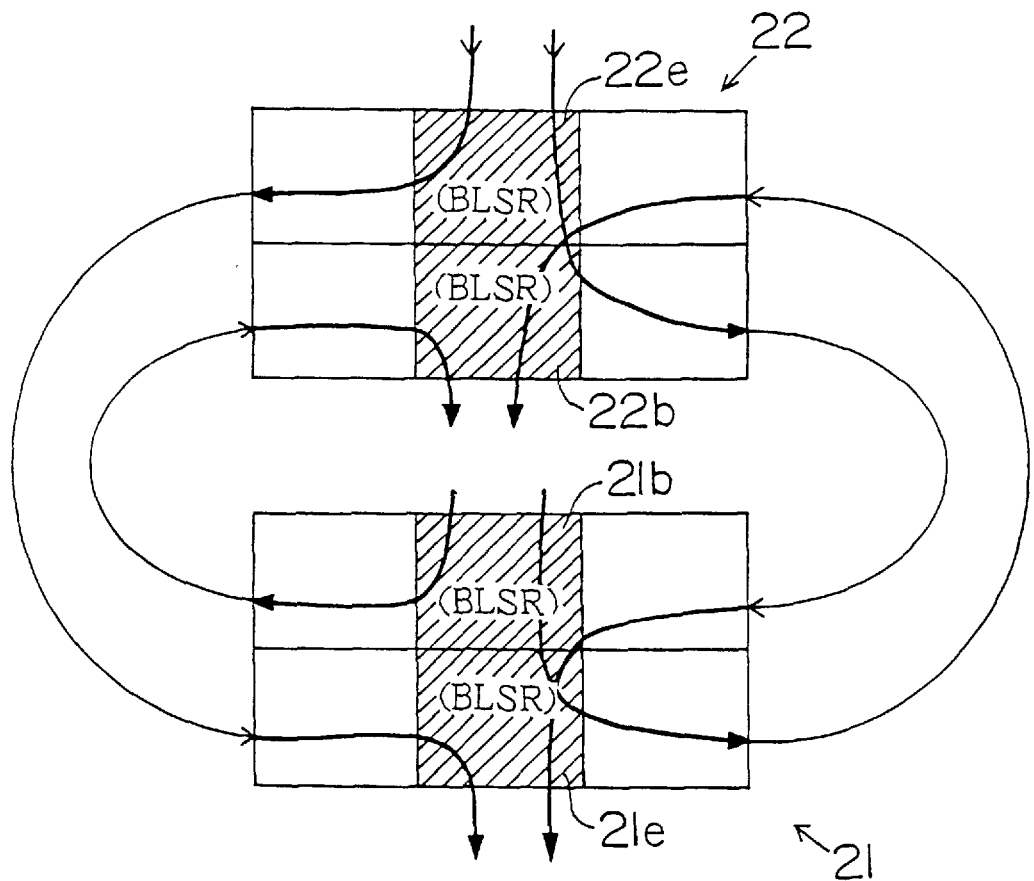
FIG. 10 is a view showing a fifth stage during the transfer of a ring optical transmission system from the UPSR system to the BLSR system.

FIG. 10, which corresponds to Steps S7 to S10 in FIG. 5, shows a signal flow after the rearrangement of lines performed for the multiplexing/demultiplexing conversion boards which operate in the BLSR system. The rearrangement of lines is performed based on the command of the supervisory control board 9 shown in FIG. 3.

Next, a method for changing the supervisory control board shown in Step S2 in FIG. 5 from the UPSR system to the BLSR system will be described with reference to FIGS. 11 to 13. Specifically, each of the supervisory control board 1ha of the UPSR system and the supervisory control board 9 of the BLSR system comprises a supervisory control board mounting volatile memory (RAM) and a supervisory control board mounting nonvolatile memory (EPROM). The former is connected to the high-level supervisory controller and the latter is connected to the multiplexing/demultiplexing conversion board.

Figure 11:
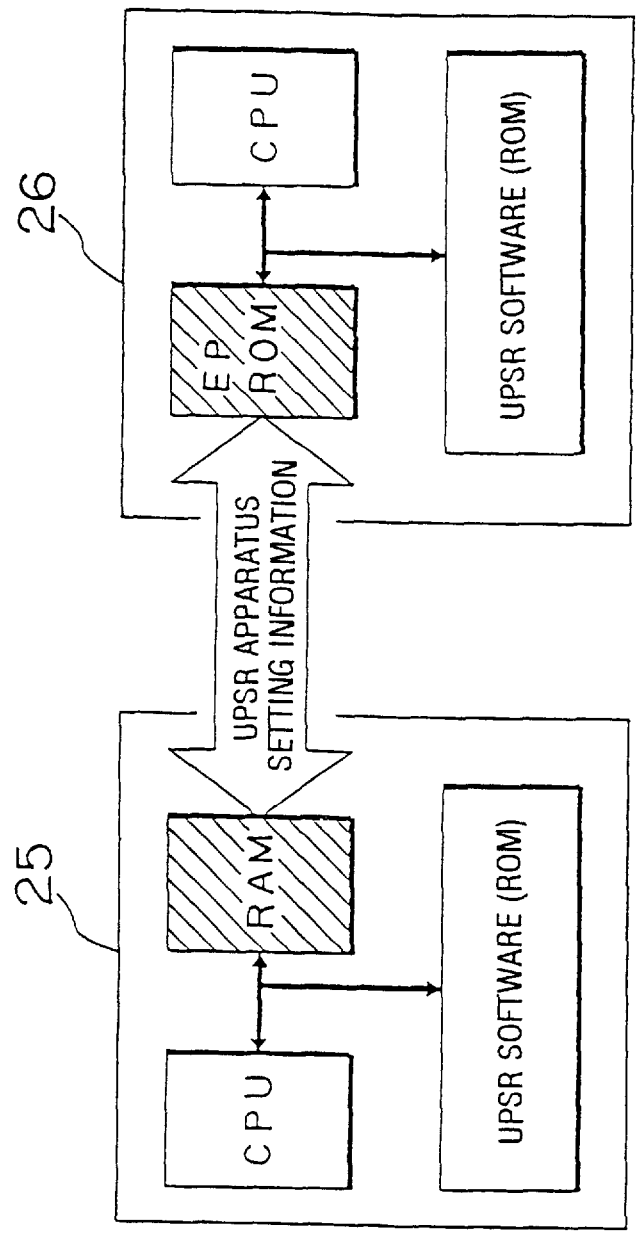
FIG. 11 is a view showing a first stage during the replacement of a supervisory control board of the UPSR system by that of the BLSR system.

First, as shown in FIG. 11, before the supervisory control board 1ha of the UPSR system is replaced by the supervisory control board 9 of the BLSR system, a supervisory control board 25 mounting volatile memory (RAM) and a changeover control board 26 mounting nonvolatile memory (EPROM) share various pieces of setting information of the UPSR system in the mutual memories. Both of the supervisory control boards 25 and changeover control board 26 have a CPU and a ROM storing software for the operation of the UPSR system. The EPROM in the supervisory control board 26 is used for backup of various pieces of setting information.

Figure 12:
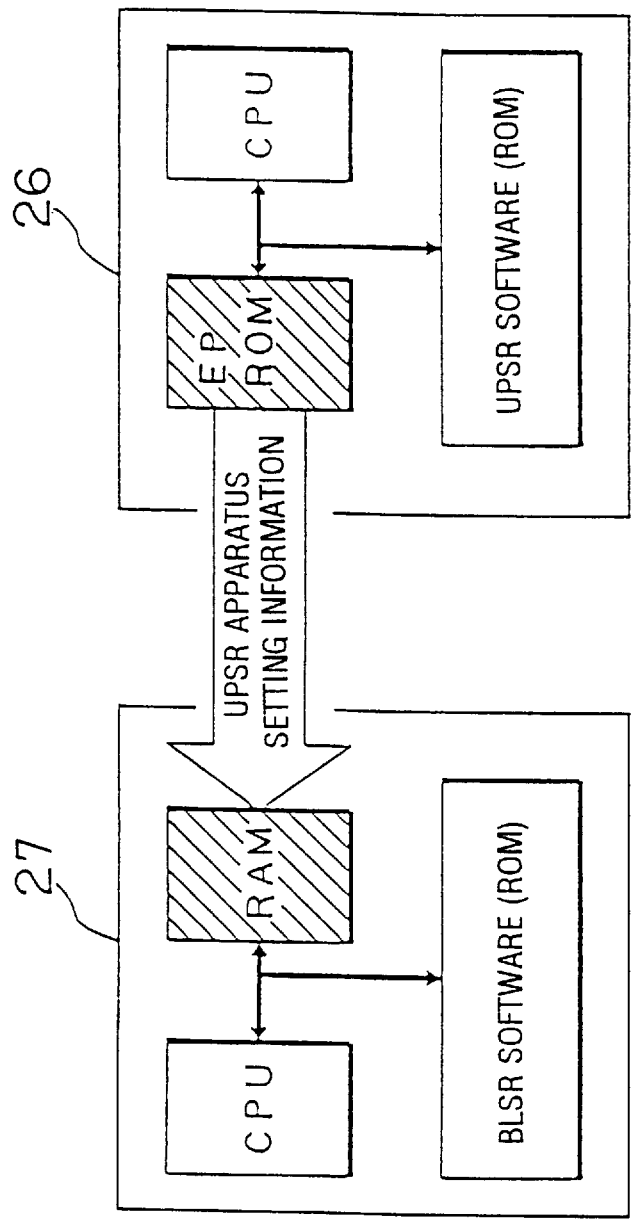
FIG. 12 is a view showing a second stage during the replacement of a supervisory control board of the UPSR system by that of the BLSR system.

Next, as shown in FIG. 12, the supervisory control board 25 of the UPSR system is replaced by a supervisory control board 27 mounting volatile memory (RAM) of the BLSR system. At this time, various pieces of setting information of the UPSR system, stored in the EPROM of the supervisory control board 26, are written in a RAM of the control board 27. The supervisory control board 27 has a CPU and a ROM storing software for the operation of the BLSR system.

Figure 13:
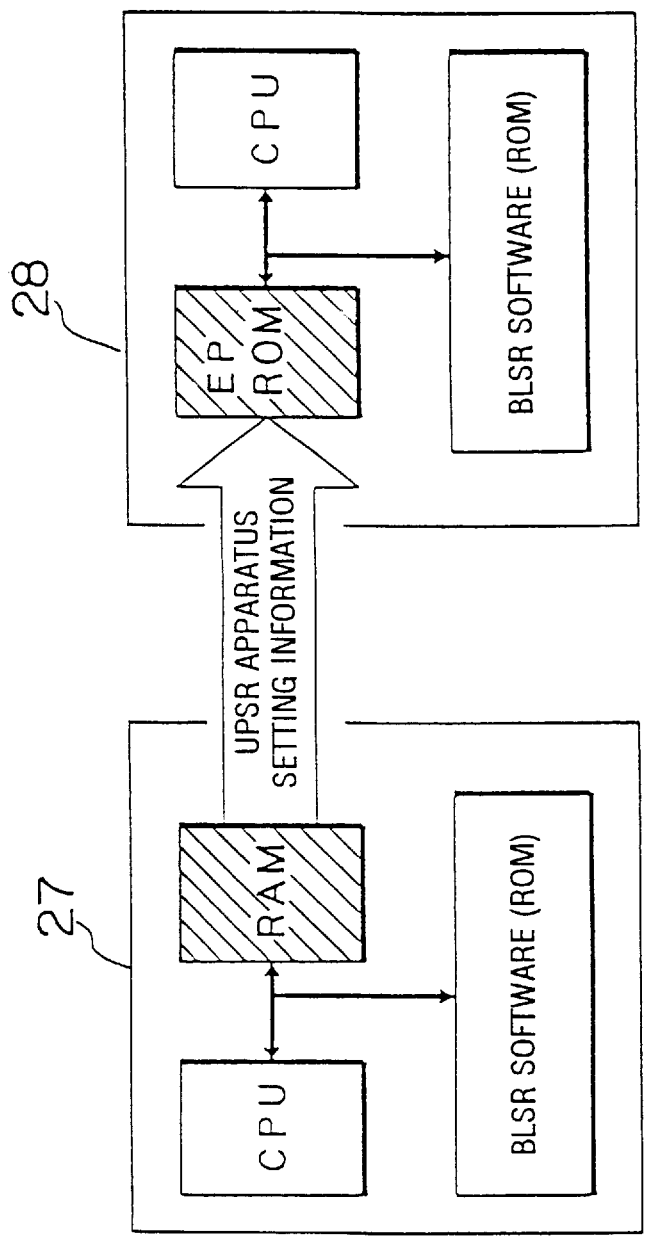
FIG. 13 is a view showing a third stage during the replacement of a supervisory control board of the UPSR system by that of the BLSR system.

Finally, as shown in FIG. 13, the supervisory control board 26 of the UPSR system is replaced by a supervisory control board 28 mounting nonvolatile memory (EPROM) of the BLSR system. At this time, various pieces of setting information of the UPSR system, stored in the RAM of the supervisory control board 27, are written in an EPROM of the supervisory control board 28. The supervisory control board 28 has a CPU and a ROM storing software for the operation of the BLSR system.

Thus, the supervisory control boards 27 and 28 of the BLSR system take over various pieces of setting information in the supervisory control boards 25 and 26 of the UPSR system, share mutual memories, and operate in the UPSR mode in the software of the BLSR system.

Next, a second procedure for transferring a ring optical transmission system from the UPSR system to the BLSR system during operation will be described. In the second procedure, the number of times the replacement worker goes around the ring is reduced as compared with the first procedure.

Figure 14:
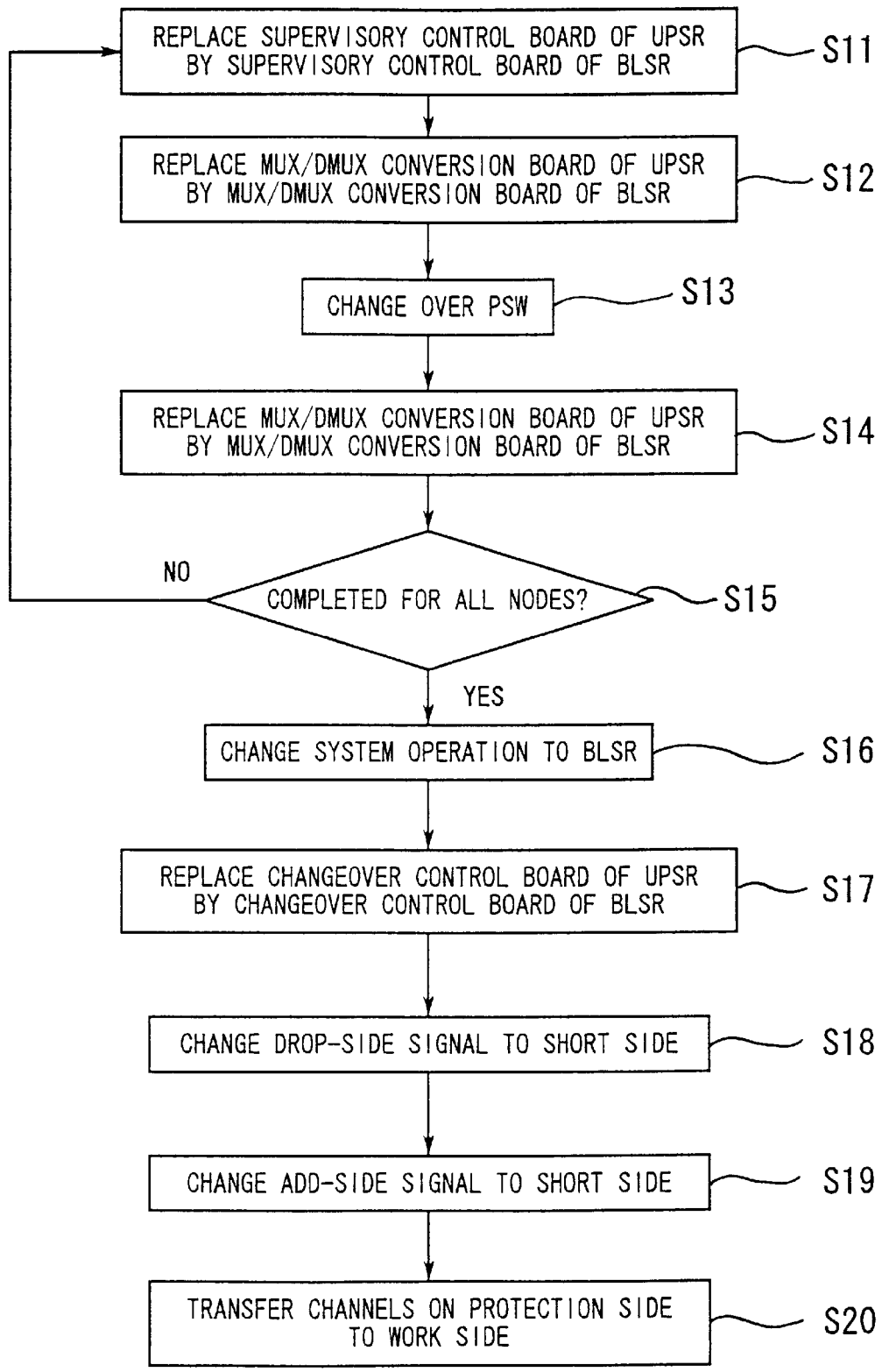
FIG. 14 is a flowchart showing a second procedure for transferring a ring optical transmission system from the UPSR system to the BLSR system during operation.

FIG. 14 is a flowchart showing a second procedure. Hereafter, the explanation is made following the step numbers in FIG. 14.

[S11] First, the path switch 1g in the node 1 shown in FIG. 1 is changed over to one side, for example, to the side on which the demultiplexing signal from the multiplexing/ demultiplexing conversion board 1b in connection with the optical fibers 5a to 5d is selected. Then, the supervisory control board 1ha (FIG. 2) of the UPSR system in the node 1 is replaced by the supervisory control board 9 of the BLSR system shown in FIG. 3.

[S12] The multiplexing/demultiplexing conversion board 1e of the UPSR system in the node 1 shown in FIG. 1 is replaced by the first multiplexing/demultiplexing conversion board 8 of the BLSR system shown in FIG. 3. However, the operation of the first multiplexing/demultiplexing conversion board 8 is kept being the system operation of the UPSR system as shown in FIG. 4. Since the multiplexing/demultiplexing conversion board 1e is on the protection side due to the changeover of the path switch 1g performed by the execution of the above Step S11, the replacement can be made even during the operation of the line.

[S13] Next, the path switches 1g in the nodes shown in FIG. 1 is changed over to the other side, for example, to the side on which the demultiplexing signal from the multiplexing/demultiplexing conversion board in connection with the optical fibers 6a to 6d is selected.

[S14] The multiplexing/demultiplexing conversion board 1b of the UPSR system in the node 1 shown in FIG. 1 is replaced by the second multiplexing/demultiplexing conversion board 7 of the BLSR system shown in FIG. 3. However, the operation of the second multiplexing/demultiplexing conversion board 7 is kept being the system operation of the UPSR system as shown in FIG. 4. Since the multiplexing/demultiplexing conversion board 1b is on the protection side due to the changeover of the path switch 1g performed by the execution of the above Step S13, the replacement can be made even during the operation of the line.

[S15] The above Steps S11 to S14 are executed repeatedly for the nodes 2 to 4. After the execution for all nodes is completed, the procedure advances to Step S16.

[S16 to S20] Explanation is omitted because these steps are the same as Steps S6 to S10 shown in FIG. 5.

As described above, in the second procedure, the replacement worker goes around the ring merely one time when the procedure advances from Step S15 to Step S16, so that only a total of two times of rounding the ring are required. However, in the second procedure, the path switch of the node is changed over in Steps S11 and S13, and this changeover operation is performed for each node, so that the transmission signal is shut off momentarily 4N times (N denotes the number of nodes) in the whole system. Therefore, the second procedure is superior to the first one in terms of the rounding of the ring, but the first procedure is superior to the second one in terms of the shutoff of transmission signal.

In the present invention, as described above, the multiplexing/demultiplexing conversion board of the UPSR system, which is positioned on the protection side by the path switch, is replaced by the multiplexing/demultiplexing conversion board of the BLSR system, and at the same time, the multiplexing/demultiplexing conversion board of the BLSR system is kept being operated in the UPSR system. When all of the multiplexing/demultiplexing conversion boards in the system are changed to the BLSR system, the operation of all the multiplexing/demultiplexing conversion boards is transferred to the system operation of the BLSR system, and the line setting is changed from the UPSR system to the BLSR system.

Thereupon, the ring transmission system which has been constructed in the UPSR system can be transferred to the BLSR system while the line is in service.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system transfer method from a UPSR (Uni-directional Path Switched Ring) system to a BLSR (Di-directional Line Switched Ring) system during operation, comprising the steps of:

(1) replacing a control board of the UPSR system by a control board of the BLSR system;

(2) changing over a path switch to one direction to replace a multiplexing/demultiplexing conversion board of the UPSR system, which is positioned in the other direction, by a first multiplexing/demultiplexing conversion board of the BLSR system, and at the same time, making said first multiplexing/demultiplexing conversion board operate in the UPSR system (3) changing over said path switch to said other direction to replace a multiplexing/demultiplexing conversion board of the UPSR system, which is positioned in said one direction, by a second multiplexing/demultiplexing conversion board of the BLSR system, and at the same time, making said second multiplexing/demultiplexing conversion board operate in the UPPSR system;

(4) making said first and second multiplexing/demultiplexing conversion boards operate in the BLSR system; and (5) changing a line arrangement set at said first and second multiplexing/demultiplexing conversion boards from the UPSR system to the BLSR system.

2. A system transfer method according to claim 1, wherein said step (1) comprises the steps of:

(1a) writing various pieces of setting information stored in a nonvolatile memory which is mounted in a first supervisory control board of the UPSR system in a volatile memory which is mounted in a second supervisory control board of the BLSR system; and (1b) writing various pieces of setting information written in said volatile memory in said second supervisory control board in a nonvolatile memory in a third supervisory control board of the BLSR system.

3. A transmission apparatus which is transferred from a UPSR (Uni-directional Path Switched Ring) system to a BLSR (Bi-directional Line Switched Ring) system during operation, comprising:

a control board of the BLSR system by which a control board of the UPSR system is replaced;

a first multiplexing/demultiplexing conversion board of the BLSR system by which, when a path switch is changed over to one direction, a multiplexing/demultiplexing conversion board of the UPSR system, which is positioned in the other direction, is replaced, and which is at the same time made to operate in the UPSR system;

a second multiplexing/demultiplexing conversion board of the BLSR system by which, when said path switch is changed over to said other direction, a multiplexing/demultiplexing conversion board of the UPSR system, which is positioned in said one direction, is replaced, and which is at the same time made to operate in the UPSR system;

operation control means for making said first and second multiplexing/demultiplexing conversion boards operate in the BLSR system; and changing means for changing a line arrangement set at said first and second multiplexing/demultiplexing conversion boards from the UPSR system to the BLSR system.

4. A system transfer method in which a UPSR (Unidirectional Path Switched Ring) system having a plurality of nodes is transferred to a BLSR (Bi-directional Line Switched Ring) system during operation, comprising the steps of (1) replacing a control board of the UPSR system by a control board of the BLSR system in each node;

(2) changing over a path switch in each node to the same one direction to replace a multiplexing /demultiplexing conversion board of the UPSR system in each node, which is positioned in the same other direction, by a first multiplexing/demultiplexing conversion boards of the UPSR system;

(3) changing over said path switch in said each node to said other direction to replace a multiplexing/demultiplexing conversion board of the UPSR system in said each node, which is positioned in said one direction, by a second multiplexing/demultiplexing conversion board of the BLSR system, and at the same time, making each of said second multiplexing/demultiplexing conversion boards operate in the UPSR system;

(4) making said first and second multiplexing/demultiplexing conversion boards operate in the BLSR system; and (5) changing a line arrangement set at said first and second multiplexing/demultiplexing conversion boards from the UPSR system to the BLSR system.

5. A system transfer method in which a UPSR (Unidirectional Path Switched Ring) system having a plurality of nodes is transferred to BLSR (Bi-directional Line Switched Ring) system during operation, comprising the steps of:

(1) replacing a control board of the UPSR system by a control board of the BLSR system in a node;

(2) changing over a path switch in said node to one direction to replace a multiplexing/demultiplexing conversion board of the UPSR system in said node, which is positioned in the other direction, by a first multiplexing/demultiplexing conversion board of the BLSR system, and at the same time, making said first multiplexing/demultiplexing conversion boards operate in the UPSR system;

(3) changing over said path switch to said other direction to replace a multiplexing/demultiplexing conversion board of the UPSR system in said node, which is positioned in said one direction, by a second multiplexing/demultiplexing conversion board of the BLSR system and at the same time, making said second multiplexing/demultiplexing conversion boards operate in the UPSR system;

(4) executing said steps (1), (2) and (3) for each of remaining nodes other than said node;

(5) making said first and second multiplexing/demultiplexing conversion boards operate in the BLSR system, and (6) changing a line arrangement set at said first and second multiplexing/demultiplexing conversion boards from the UPSR system to the BLSR system.

* * * * *